April 20, 1965  J. W. ROSS ETAL  3,179,781
PIPE WELDING MACHINE AND PROCESS
Filed April 18, 1961  7 Sheets-Sheet 1

FIG. 1

INVENTORS
JOHN W. ROSS
ALFRED N. MARNER, JR.
BARRY C. MILLAR
BY Barnwell R. King
ATTORNEY

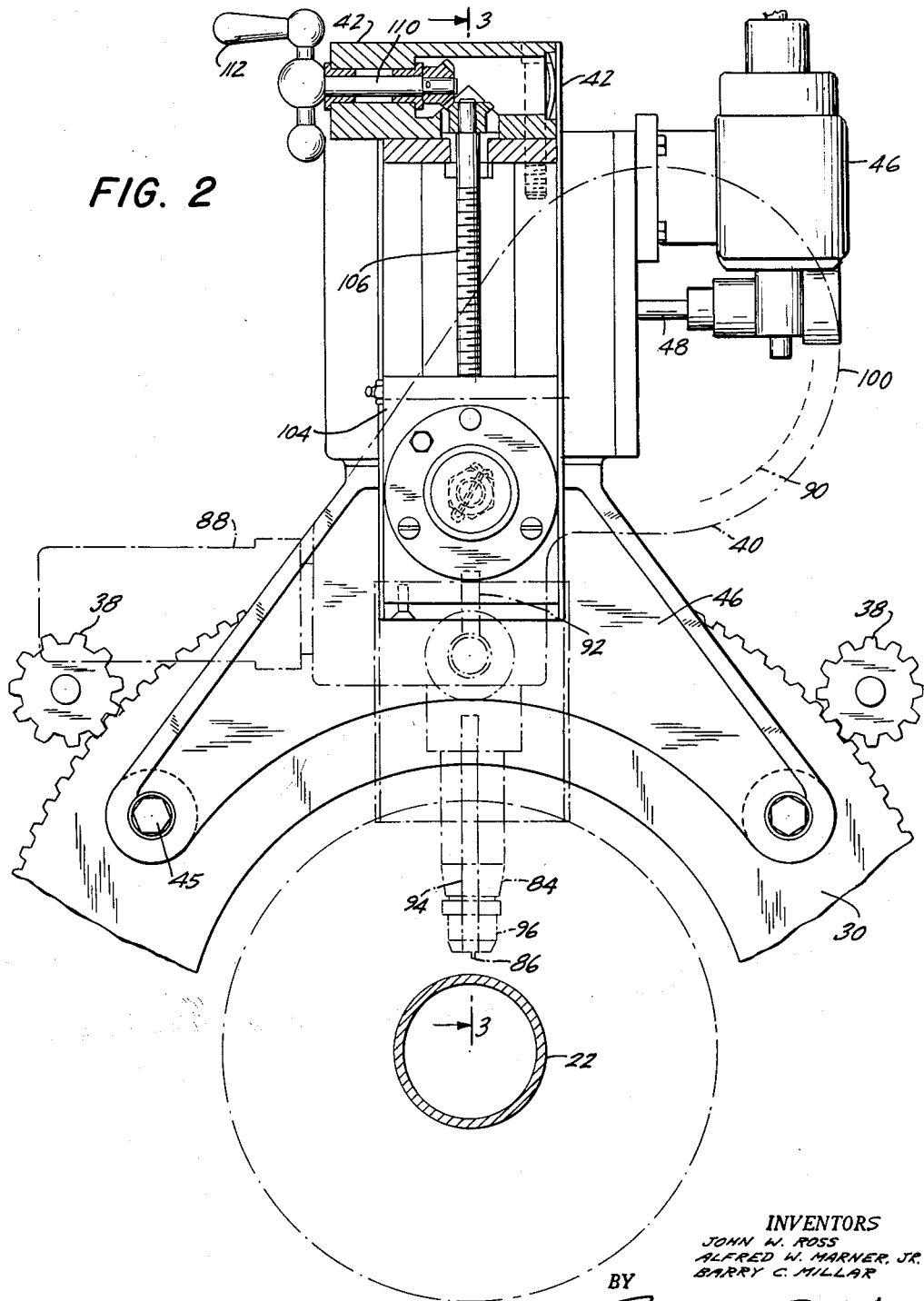

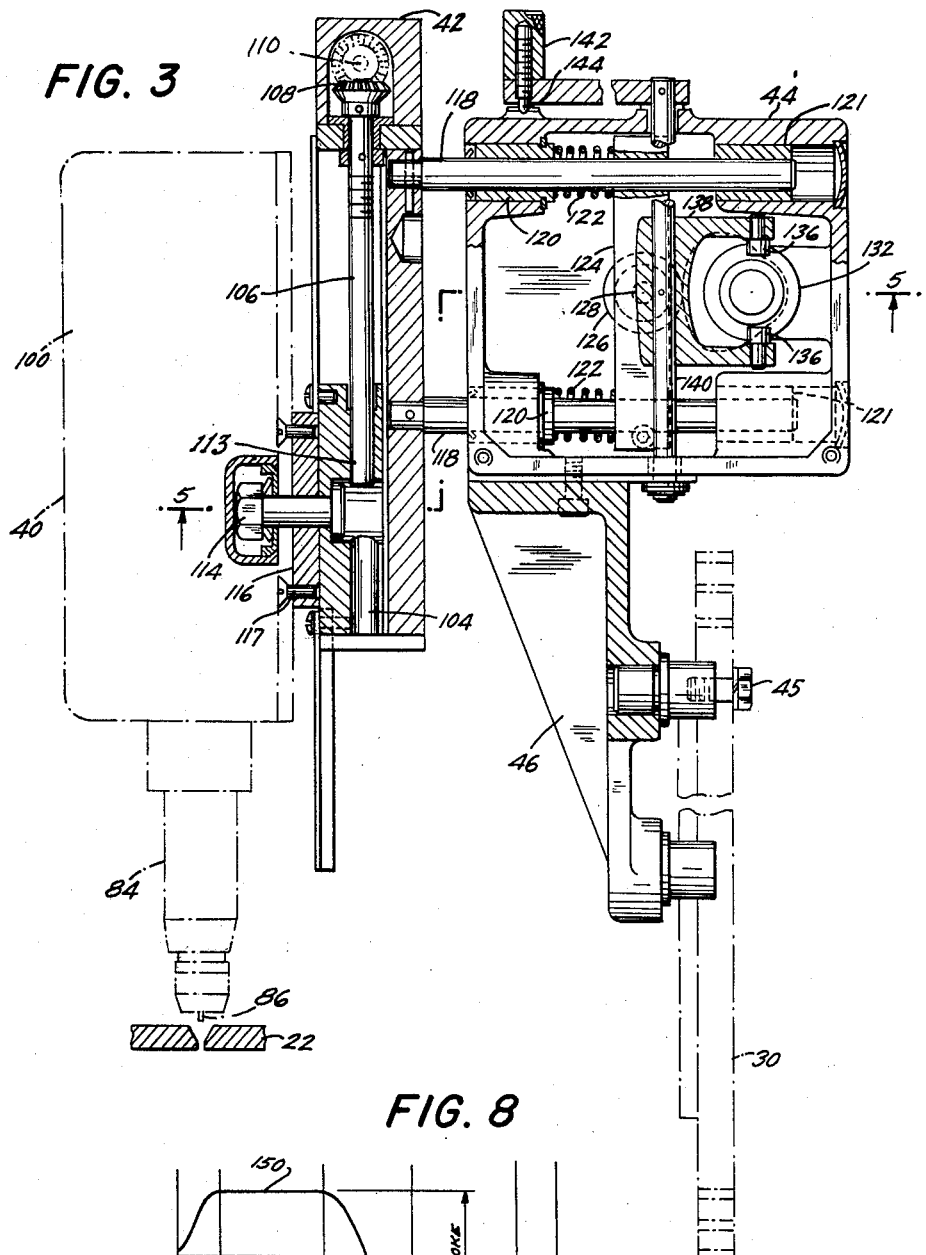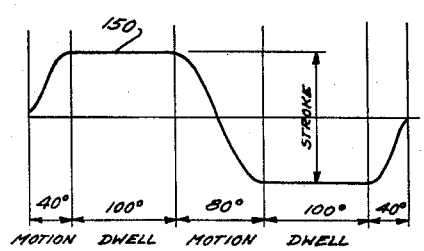

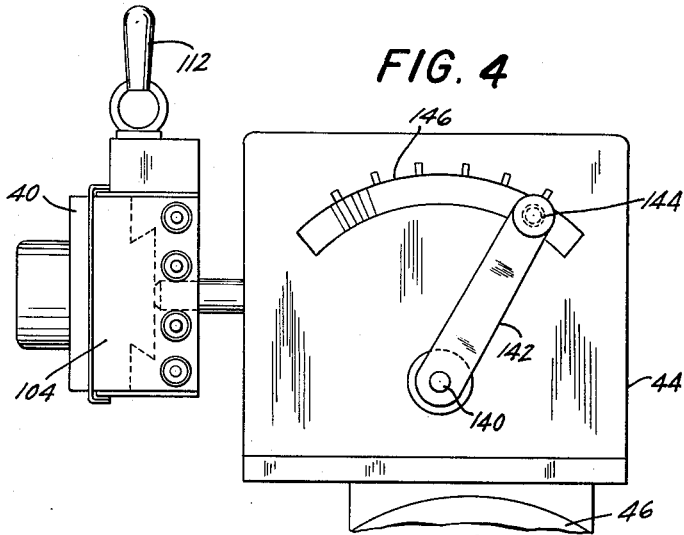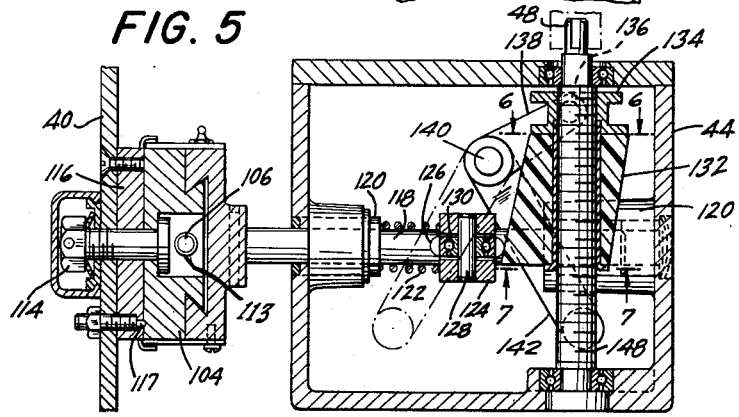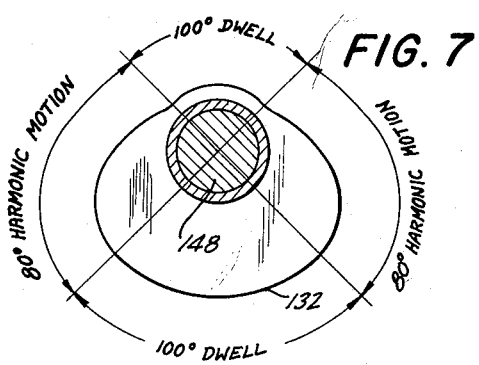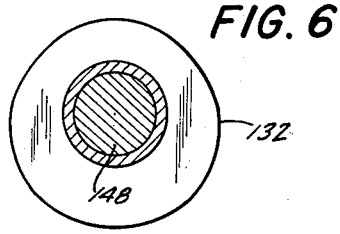

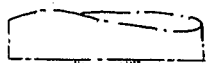
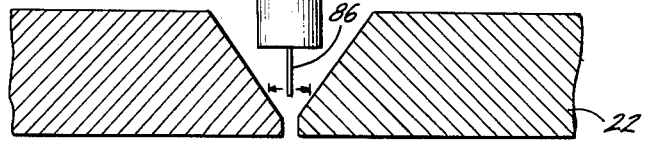
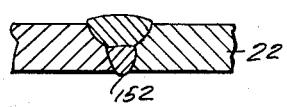
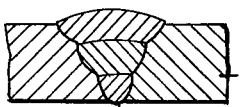
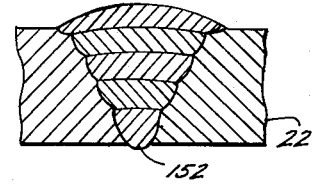
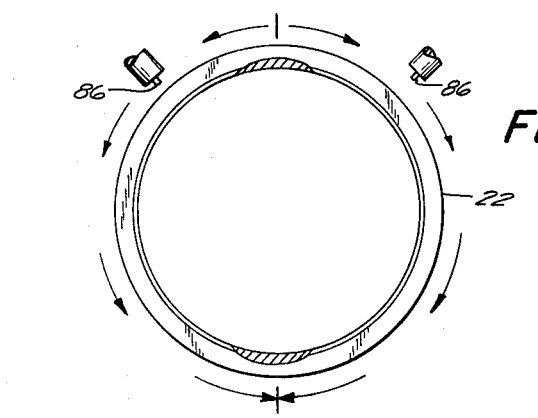

April 20, 1965   J. W. ROSS ETAL   3,179,781
PIPE WELDING MACHINE AND PROCESS
Filed April 18, 1961   7 Sheets-Sheet 7

INVENTORS
JOHN W. ROSS
ALFRED W. MARNER, JR.
BARRY C. MILLAR
BY Barnwell R. King
ATTORNEY

United States Patent Office 3,179,781
Patented Apr. 20, 1965

3,179,781
PIPE WELDING MACHINE AND PROCESS
John W. Ross, Toronto, Ontario, Canada, Alfred W. Marner, Jr., Linden, N.J., and Barry C. Millar, Toronto, Ontario, Canada, assignors to Union Carbide Canada Limited, a corporation of Canada
Filed Apr. 18, 1961, Ser. No. 103,771
9 Claims. (Cl. 219—60)

This invention relates to work-in-circuit arc welding, and more particularly to the "position" welding of pipe.

Prior to the present invention steel pipe sections were arc welded by hand with flux-coated stick electrodes by rolling the pipe sections, if possible, under the welding site to obtain the benefits of "downhand" welding to produce welds of code quality. In such case the root pass was made by a straight weld, followed by careful cleaning of the surface by removal of the resultant slag covering such weld by chipping, wire brushing and sometimes even grinding. Such cleaning was also necessary between subsequent filler, cover, or capping passes. It is evident that such method was time consuming, laborious and expensive, especially so, since skillful workmanship was involved.

The main object of this invention is to provide a method of and means for making code quality welds in steel pipe with a minimum of operator skill and effort. Other objects will appear from the following disclosure.

The invention provides a novel process and machine for making code quality welds in steel pipe quickly, efficiently and with more uniformly higher quality than was possible prior thereto. This is accomplished mainly by the combination of novel critical transverse oscillation of a flux-free short-circuiting type sigma (shielded-inert-gas-metal-arc) consumable wire electrode, especially during the root pass. Such critical transverse oscillation is such that effective penetration of the weld by virtue of complete fusion with the base metal is obtained, as well as elimination of undercutting and improvement in the weld bead contour. Essentially, this is obtained by a critical dwell of the consumable wire electrode at each side of the joint for a sufficient period for electrode metal to be deposited and fused with the base metal as well as with the metal of preceding weld passes.

More particularly, according to the invention there is provided a novel process of flux-free arc welding steel pipe, which comprises first connecting pipe sections to be welded with tack-welds of the order of 1-2 inches in length extending through the 6 and 12 o'clock positions, to secure such sections in fixed relative position with an open V-joint therebetween having a root spacing gap of the order of $\frac{1}{16}$ inch–$\frac{1}{8}$ inch wide, actually separating said sections except for such tack-welds. A short-circuiting type sigma root pass weld is started on such 12 o'clock tack-weld with an electrode wire having a diameter of the order of $\frac{1}{32}$ inch and the operation is then carried toward the 6 o'clock tack-weld first about one half, and then about the other half of the pipe, as the consumable electrode wire is oscillated at a preselected constant amplitude from one side to the other in such joint. A root pass weld is thus produced of welding code quality, which is fully penetrated and completely fused by virtue of a dwell in such oscillation of the electrode wire on either side of such joint, at a selected dwell period of between 60° and 150° of each oscillation half-cycle. Such side-dwell type oscillation unexpectedly results in a concaved weld bead surface that is free of slag and highly suitable for receiving subsequent weld passes without any need for cleaning. Subsequent passes are made in a similar way to fill and cap the joint.

The invention also provides a machine for work-in-circuit flux-free electric arc welding horizontally positioned steel pipe, comprising a sigma welding unit including means for feeding a wire electrode radially of the pipe toward such joint, means for discharging a stream of arc-shielding gas composed of a mixture of $CO_2$ and argon around and in the same direction as such electrode, and means for conducting welding current to the electrode wire as it is so fed toward such joint. Means supported by the pipe being welded is provided for guiding said unit arcuately in either direction along a path concentric with the axis of such pipe. A motor is connected to drive said unit in such path in a selected direction at a preselected speed that is adjustable. Means for oscillating said welding unit transversely with respect to such path as the unit travels therealong with the critical dwell of the arc on either side of the joint, includes a cam and a cam follower one of which is adjustable to change the amplitude of such oscillation, an oscillator-motor connected to drive said cam, and means for adjusting the speed of said oscillator motor to change the frequency of such oscillation. The electrode wire is "inched" into contact with the 12 o'clock tack-weld to start a root pass in such joint which is fully penetrated by the oscillation of the electrode wire from one side to the other in the open V-joint as the unit travels from such 12 o'clock to the 6 o'clock position. The cam has a shape such that the wire electrode oscillates rapidly across the joint but dwells at a selected angle of between 60° and 150° of each cam revolution at either side thereof. As a result good side-wall fusion is assured, as well as concave weld-head contour in such root pass to provide a weld base of welding code quality in such joint for such subsequent filler weld passes as may be needed to fill the joint.

In the drawings:

FIG. 1 is a fragmentary perspective view of a pipe welding machine illustrating the invention.

FIG. 2 is an enlarged fragmentary cross section of the machine taken on line 2—2 of FIG. 1.

FIG. 3 is a fragmentary view in section taken on line 3—3 of FIG. 2.

FIG. 4 is a top plan view of the oscillation amplitude controller.

FIG. 5 is a fragmentary view of such controller in cross section taken on line 5—5 of FIG. 3.

FIG. 6 is a cross sectional detail taken on line 6—6 of FIG. 5.

FIG. 7 is a similar view of the cam taken on line 7—7 of FIG. 5.

FIG. 8 is a graphical representation of one oscillating cycle of the wire electrode in making a weld pass.

FIG. 9 is an enlarged fragmentary cross sectional view illustrating the transverse oscillation of the welding head in making root passes according to the invention.

FIG. 10 is a fragmentary cross sectional view of the tack welded joint between the pipe sections to be welded, showing how the welds are carried downwardly in each case on each arcuate half of the pipe.

FIGS. 11, 12, and 13 are fragmentary cross sectional views of pipe of different wall thicknesses welded according to the invention with 2, 3 and 5 passes, respectively.

FIG. 14 is a table of welding conditions for making the various weld passes of FIGS. 11–13.

Figure 15:
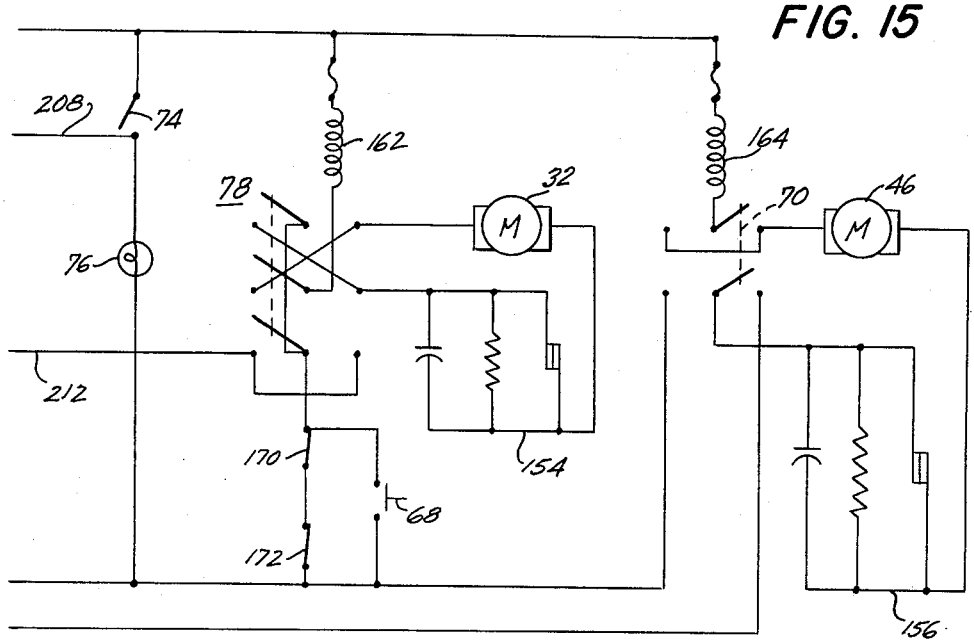

FIG. 15 is a circuit diagram of that part of the electrical system relating to welding pass rotation and oscillation.

Figure 16:
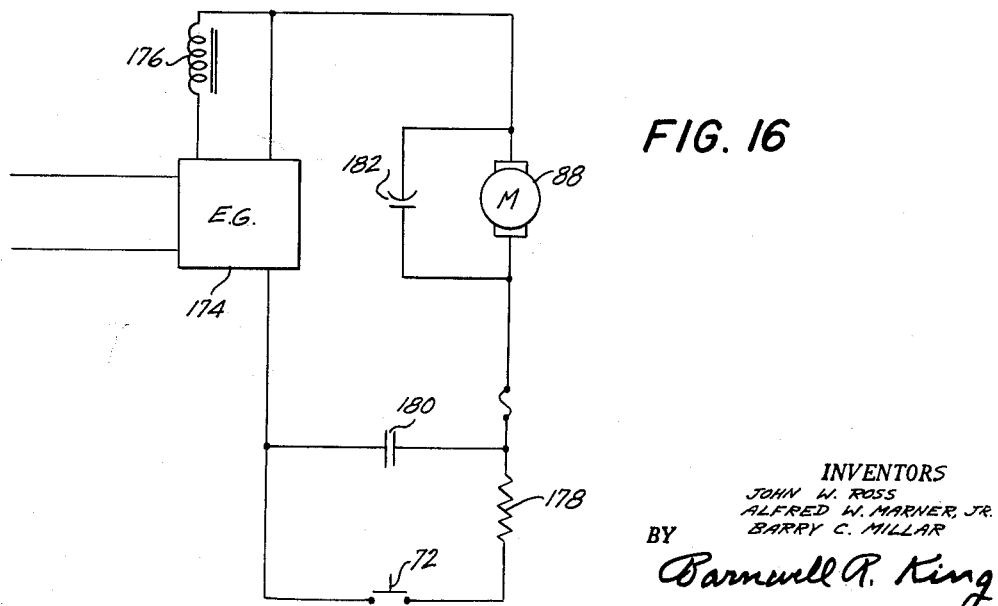

FIG. 16 is a circuit diagram of that part of the electrical system relating to the electrode wire feed motor.

Figure 17:
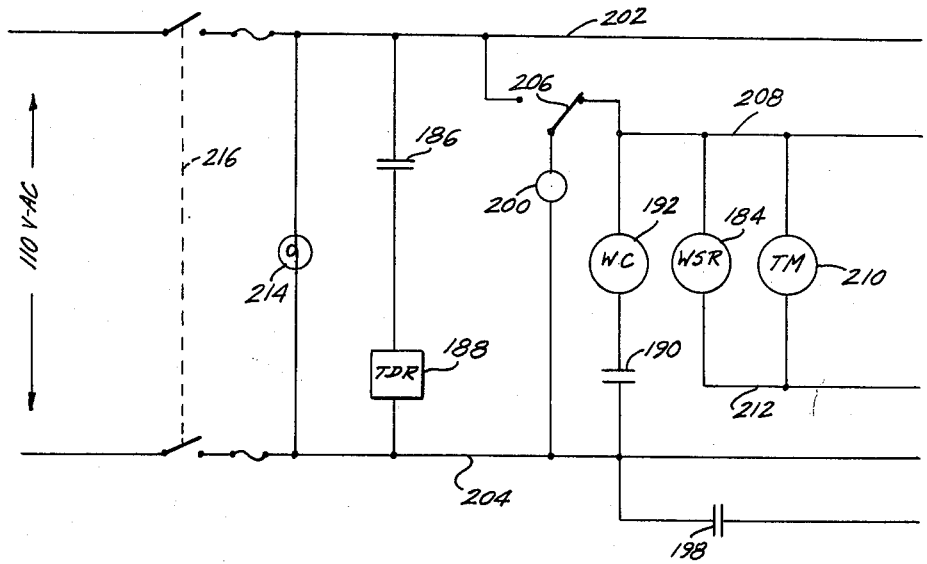

FIG. 17 is a circuit diagram of that part of the electrical system relating to the control relays.

Figure 18:
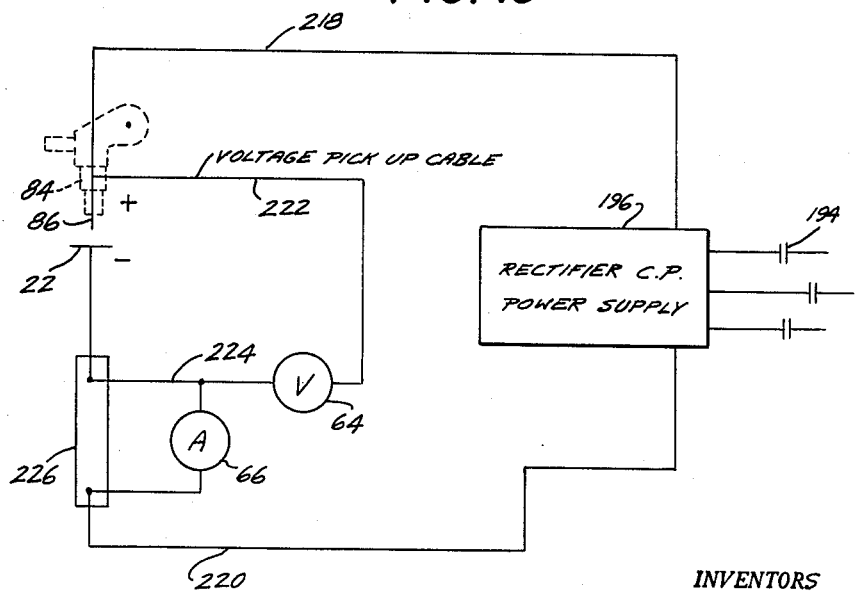

FIG. 18 is a circuit diagram of that part of the system relating to the welding circuit.

As shown in FIG. 1, the welding machine M is mounted on a pipe 22 which is in a substantially horizontal position. Such machine M is provided with a saddle 24 which rests on top of the pipe, being secured in position by a releasable clamp including a chain and spring assembly 26. Mounted on one end of the saddle 24 is a horseshoe guide member 28 on which a similarly shaped "ring" gear 30 is adapted to rotate. The ring gear 30 is driven by a motor 32 through a coupling 34, a chain 36, and pinions 38, which mesh with the ring gear 30 on opposite sides of the upper quadrant thereof. Such mounting is similar to that disclosed in application Ser. No. 5,465, filed January 29, 1960, by Ross et al., now Pat. No. 3,088,018 dated April 30, 1963.

Mounted on the ring gear 30 for rotation therewith by the motor 32, is a sigma welding unit 40. Such unit is provided with a mechanism 42 for adjusting the same radially with respect to the pipe 22, and with an oscillating mechanism 44 which is also adjustable, those parts being carried by a bracket 48 which is bolted at 45 to the ring gear 30. The oscillating mechanism 42 is driven by a motor 46, the speed of which is adjustable to vary the oscillation frequency. Such motor 46 is mounted on the back of the casing containing oscillating mechanism 44.

The drive motor 32 is mounted on a control box 58 on the stationary part of the machine M. The circuit in the control box is connected by a flexible cable 60 to a circuit in a relay box 62, the front panel of which is provided with a welding voltage meter 64 and a welding current meter 66.

The front panel of the control box 58 is provided with a push button switch 68, an "oscillating" switch 70, a wire-feed push button switch 72, a weld start switch 74, a pilot light 76 to indicate when the weld start switch 74 is closed, and a weld pass-rotation switch 78 for controlling the direction of rotation of the sigma welding unit 40.

Lateral adjustment of the upper part of the machine M with respect to the saddle 24 is obtained by means including a knob 80 which controls the position of a platform 82 longitudinally of the pipe with respect to such saddle which is clamped on the pipe. Such mechanism includes horizontal guides and a screw and nut arrangement, the latter being operated by turning knob 80.

The sigma welding unit 40 includes a sigma welding torch 84 through which an electrode wire 86 is fed radially toward the pipe 22 during the welding operation, by suitable feed means including a drive motor 88. Wire for the electrode is drawn from a reel 90 carried by the sigma welding unit by suitable feed rolls 92 which also advances the wire through a contact-guide tube 94 in the torch 84. Welding current is conducted to the wire electrode 86 by the contact-guide tube 94 as the wire moves therefrom. At the same time gas for shielding the welding arc which is energized between the end of the wire electrode 86 and the work 22 is discharged from the torch 84 through a hose to nozzle 96 mounted on the outlet end 84. The sigma welding unit 40 is provided with a removable cover 100 that is provided with a window 102, and held in place by suitable means including a nut 103.

The sigma welding unit 40 per se is connected to the mechanism 42 by a vertically movable slide 104. Such slide is adjusted by means including a worm screw 106 connected by a crown gear 108 to a horizontal stub shaft 110 of a hand crank 112. The worm screw 106 is connected to the slide 104 by a threaded bore 113 which meshes with the screw 106.

The sigma welding unit 40 is pivotedly connected to the slide 104 by a bolt 114 which extends through a bearing plate 116 which can be turned about the axis of the bolt 114 and with respect to the slide 104; being held in the proper welding position by a spring pressed detent 117 which cooperates with a corresponding recess in the slide 104. Thus, the sigma welding unit 40 may be tilted for service and inspection of the torch 84 by simply tilting it with sufficient force to unseat the detent 117.

The mechanism 42 on which the sigma welding unit is so mounted, is carried by the outer ends of parallel rods 118 of the oscillating mechanism 44. The rods 118 are supported by and slide in bearings 120 and 121, provided therefor in the casing of the oscillating mechanism. The sigma welding unit 40 is urged toward the bracket 46 by compression springs 122 which surround the rods 118 between the bearings 120 and a common cross-head or yoke 124. Such cross-head is attached to the rods 118, and to a cam follower 126 by a pin 128 and ball bearings 130. The cam follower 126 is operatively associated with a three-dimensional cam 132 which preferably is composed of plastic containing metal filler, but may be any other suitable material.

Such cam 132 is connected to an end member 134 provided with an annular groove in which fingers 136, 136 extend from the opposite tines of a fork 138, the base of which is pivoted to a shaft 140 of a manual crank 142. Such crank 142 is provided with a spring loaded pin 144 for cooperation with a serrated arcuate member 146 which is mounted on the top of the casing containing the oscillating mechanism 44. Thus, adjustment of the hand crank 142 is used to set the amplitude of oscillation of the sigma welding unit 40 by shifting the cam 132 longitudinally on its axis of rotation, since the position of the cam follower 126 is relatively fixed horizontally with respect to such axis. The cam 132 is driven by motor 46 through the flexible cable 48 which rotates shaft 148 that is longitudinally splined to the inside of the cam 132. This permits adjustment of the cam longitudinally of such shaft without interfering with the driving relation of such cam with motor 46.

The three-dimensional cam 132 is critically shaped to produce a delay in the transverse movement of the welding unit 40 of between 60° and 150° (of cam revolution) when the welding wire 82 is at either side of the joint being welded. The selected amplitude of such transverse movement falls between the minimum amplitude and the maximum amplitude, respectively, of the cam 132, depending on the adjustment of the hand crank 142. As shown in FIG. 8, the novel shape of cam 132 actuates the cam follower and with it the sigma welding unit 40, so that the constantly fed wire electrode 86 oscillates along with the welding arc back and forth across the joint being welded along a path 150 which delays for 100° of each cam revolution at each side of the joint as the welding operation progresses downwardly from the 12 o'clock position to the 6 o'clock position. FIG. 9 shows how the constantly fed wire electrode 86 moves from one side of the joint to the other in making a root pass in the open joint between the pipe sections. The resulting root pass is shown at 152 in FIG. 13.

As shown in FIG. 15, the electrical circuit for energizing and controlling the rotation motor 32 and the oscillation motor 46 includes a constant speed fly-ball governor circuit 154 for the motor 32, and a similar circuit 156 for the motor 46, the selected speed of each motor being normally adjusted by means including a knob 158 and 160, respectively, FIG. 1. The field windings of the series motors 32 and 46 are indicated at 162 and 164, respectively, on FIG. 15. Triple-pole double-throw switch 78 and double-pole double-throw switch 70 are provided to control the energization, as well as the direction of rotation of the motors 32 and 46, when the weld start switch 74 is closed, energizing pilot light 76. Rotation limit switches 170 and 172 are located between the stationary and rotary parts of the machine to open automatically to de-energize motor 32 and stop rotation of the welding unit to prevent damage to the cable. By-pass switch 68 is normally open, as shown. Such switch is closed to permit rotation of the welding unit 40 free of the normal control system.

The wire feed motor circuit, FIG. 16, includes an electronic governor 174 for controlling the speed of the armature of the wire feed motor 88, a choke 176 being provided for absorbing voltage surges which would otherwise adversely effect the operation of such motor. Inching push button switch 72 is connected in series with a resistor 178 across normally open relay contact 180, which, when closed, results in energization of the wire feed motor 88. A condenser 182 is connected across the brushes of the motor 88 to minimize arcing in the corresponding circuit.

Contacts 180 close when welding start relay 184, FIG. 17, is energized when weld start switch 74, FIG. 15, is closed. Such energization takes place when the rotation switch 78 is in closed position. Energization of the welding start relay 184 also closes contacts 186 to energize the time delay relay 188 which, in turn, closes contacts 190, which results in the energization of a welding contactor relay 192. Energization of relay 192 closes normally open contact 194 in the three-phase power supply lines leading to the rectified constant potential power supply 196, FIG. 18. The function of the time delay relay 188 is to keep the power supply 196 energized for an instant after the welding operation stops to prevent the wire electrode 86 from being welded to the work.

Energization of weld start relay 184 also closes contacts 198, FIG. 17, resulting in the energization of the oscillation motor 47, FIG. 15, providing the switch 70 is also closed.

The gas solenoid valve 200 is connected across 110-volt power supply lines 202, 204 by a circuit which includes the switch 206, for initially setting up the machine. When the switch 206 is moved to the right hand position in circuit with line 208, the solenoid valve 200 is energized, upon closure of switch 74, to start the welding operation.

A welding timing meter 210 is connected across line 208 and line 212, thus being energized when the switches 70 and 74 are closed.

Pilot light 214 is connected across the lines 202, 204 to indicate a voltage drop there-across when main line switch 216 is closed. The arc welding circuit per se, FIG. 18, includes the pipe 22 being welded and the electrode wire 86, which are connected through the D.C. power supply lines 218 and 220, constituting the output of the power supply 196. The arc measuring voltmeter 64 is connected to the wire electrode 86 and pipe 22 by voltage pick-up leads 222 and 224, respectively. The ammeter 66 for measuring welding current is connected across a shunt 226 in the line 220.

The pieces of pipe 22 are first tack-welded together at 12 and 6 o'clock. The welding pass sequence then is as follows: Root pass started at the 12 o'clock position, proceeding counter-clockwise to 6 o'clock—stop and extinguish arc—return to 12 o'clock position—continue root pass clockwise from 12 o'clock to 6 o'clock position—stop and extinguish arc. The succeeding passes are staggered around the 12 o'clock position in such downhand technique to produce a smooth weld bead.

Oscillation of the welding head according to the invention is of prime importance. By oscillating the welding head and the welding electrode and consequently the electric welding arc over a suitable distance transversely across the joint at a critical preselected rate, about the weld center line, with critical dwells at either side, a high (code) quality weld is accomplished.

Our ocilating technique when compared to the prior stringer bead technique produces a wider and larger molten weld puddle. As the arc traverses the puddle width, penetration into the base metal and consequently complete fusion is assured for the full width, and puddle control by means of arc force is possible. Fewer passes are required to fill the joint, resulting in fewer interfaces of previously deposited or parent metal to be melted, and the possibility of lack of fusion is greatly reduced.

Our novel dwell-oscillating arc improves weld puddle control and permits the use of higher welding currents. Higher welding currents result in more complete fusion between all weld passes and the base metal assuring a higher quality of weld.

The control of the molten weld puddle is most important in the vertical or overhead positions of the pipe. The molten weld puddle must be held behind the arc so that the heat of the arc is directed on the solid metal to be melted. With prior stringer bead technique, lower current levels must be maintained to permit such weld puddle control. Higher currents with stringer bead technique may result in the molten puddle dropping from the pipe surface particularly between the 4 and 8 o'clock positions.

A further advantage of our dwell-oscillating technique is in the elimination of non-metallic inclusions. The traversing arc plays directly on nonmetallic substances deposited on the surface of previous passes and cause them to melt. The larger molten puddle allows sufficient time before its solidification for such molten substances to float to the surface of the weld. If the arc does not play directly on such foreign substances, as can occur in the stringer bead technique, they may not be melted and will be entrapped as non-metallic inclusions.

The process does not rely on the use of backing tools or rings when making the root pass. At the level of current required to gain complete penetration and fusion of the root pass, burn-through is difficult to prevent if the arc is not oscillated. The oscillating arc, with the amplitude adjusted within the range 1/8" to 5/32" greatly reduces the tendency to burn-through by directing the arc alternately on each edge of the parent metal and not centrally in the root gap. Complete fusion is obtained and the width of the fusion zone is much greater than in a non-oscillated root pass.

To produce the best X-ray quality of welds and avoid any tendency to undercutting on either side of the weld, the preselected critical pause at either extremity of the oscillation increases the weld metal deposit at the weld edges and avoids any tendency toward undercutting, particularly in the overhead position. While this motion must be used for the cover pass, its use with preceding passes is especially advantageous as it tends to produce flatter bead contours, which lead to a more stable arc condition with less spatter in depositing subsequent passes. A lack of delay when the electrode reverses direction at each weld edge, previously resulted in undercutting at both sides of the weld, particularly in the overhead position.

Another advantage of our novel oscillating technique is in the appearance and geometry of the cover pass deposit. Its appearance is uniform with a slight rounded contour and its geometry is such that no stress raising notches are present, as is sometimes encountered with the prior stringer bead technique.

Sigma welding of carbon steel pipe, according to the invention, is one with a short-circuiting type arc rather than the spray type arc. Many combinations of shielding gas may be used. Argon, helium and carbon dioxide have been used, as well as various mixtures of such gases. Conditions under which satisfactory welds can be obtained involve two ranges—one with broad limits for non-code work and one with narrower limits for high quality code work.

The broad limits are preferably as follows:

(1) Wire _____ Linde-Oxweld #65 wire .020" to .047" in diameter.
(2) Oscillation ____ 0 to 250 c.p.m.
(3) Current _____ 130 to 160 amperes.
(4) Voltage _____ 17 to 22 volts.
(5) Root pass ____ 8 to 14 i.p.m.
(6) Second pass __ 6 to 14 i.p.m.
(7) Cover pass ___ 5 to 15 i.p.m.
(8) Gas _____ 75/25 argon-carbon dioxide mixture.

Linde-Oxweld #65 wire is composed of

| Material: | Percent |
|---|---|
| Carbon _____ max__ | 0.06 |
| Manganese _____ | 1.00–1.40 |
| Phosphorus _____ max__ | 0.025 |
| Sulphur _____ max__ | 0.03 |
| Silicon _____ | 0.40–0.60 |
| Aluminum _____ | 0.05–0.15 |
| Zirconium _____ | 0.02–0.12 |
| Titanium _____ | 0.05–0.15 |
| Minimum total of aluminum, zirconium, and titanium _____ min__ | 0.15 |

The oscillation speed of motor 46 adjusted by means of a rheostat that is controlled by knob 160, FIG. 1. This adjustment can be made during the welding cycle, or when the machine is at rest. Various cams can be used depending upon the amplitude and delay desired at the outside of the weld. The delay, stated in degrees of rotation of the cam, may be widely varied.

Excellent welds have been obtained with this process. They are well fused and without undesirable slag inclusion, burn-throughs, cold laps, undercut, excessive reinforcement or other defects associated with poor welds.

The machine can weld Schedule-40 steel pipe in two (FIG. 11) or three (FIG. 12) passes, whereas the prior manual method required four passes with slag cleaning between each pass.

As pointed out above time delay relay is incorporated in the circuit, FIGS. 17 and 18, to avoid freezing the welding wire in the weld puddle. That is, when the welding action is stopped, the wire feed motor is de-energized but the welding current is left on for 0.2 second by means of such relay in order to burn off any wire which would feed down due to the momentum of the wire feed motor.

FIG. 14, taken in conjunction with FIGS. 11–13, and FIG. 10, discloses preferred welding conditions, according to the invention, for various passes in welding pipe of the different wall thickness. In each case the passes are all made downwardly from 12 to 6 o'clock, as shown.

What is claimed is:

1. Process of flux-free arc welding steel pipe, which comprises connecting pipe sections to be welded with tack-welds of the order of 1–2 inches in length extending through the 6 and 12 o'clock positions to secure such sections in fixed relative position with an open V-joint therebetween having a root spacing gap of the order of $\frac{1}{16}$ inch–$\frac{1}{8}$ inch wide actually separating said sections except for such tack-welds, starting a short-circuiting type sigma root pass weld on such 12 o'clock tack-weld with an electrode wire having a diameter of the order of $\frac{1}{32}$ inch and carrying the operation toward the 6 o'clock tack-weld first on one half and then on the other half of the pipe as the consumable electrode wire is short-circuited with the work and oscillated at a preselected constant amplitude from one side to the other in such joint, producing a root pass weld of welding code quality, which is fully penetrated and completely fused by virtue of a dwell in such oscillation of the electrode wire on either side of such joint, at a selected dwell period of between 60° and 150° on each half of each oscillation cycle, which produces a concaved weld bead surface that is highly suitable for receiving subsequent weld passes.

2. Process of flux-free sigma welding pipe, which comprises connecting pipe sections to be welded with tack-welds of the order of 1–2 inches through the 6 and 12 o'clock positions to secure such sections in fixed relative position with an open V-joint therebetween having a root spacing gap actually separating said sections except for such tack-welds, starting a short-circuiting type sigma root pass weld on such 12 o'clock tack-weld and carrying the operation toward the 6 o'clock tack weld first on one half and then on the other half of the pipe as the electrode wire is short-circuited with the work and oscillated at a preselected constant amplitude from one side to the other in such joint, producing a root pass weld of welding code quality, which is fully penetrated and completely fused by virtue of a dwell in such oscillation of the electrode wire on either side of such joint, at a selected angle of between 60° and 150°, which produces a concaved weld bead surface that is clean and highly suitable for directly receiving subsequent weld passes.

3. Process of flux-free sigma welding pipe, which comprises connecting pipe sections to be welded with tack-welds through the 6 and 12 o'clock positions to secure such sections in fixed relative position with an open V-joint therebetween actually separating said sections except for such tack-welds, starting a short-circuiting type sigma root pass weld on such 12 o'clock tack-weld and carrying the operation toward the 6 o'clock tack-weld first on one half and then on the other half of the pipe as the electrode wire is short-circuited with the work and oscillated at a preselected constant amplitude from one side to the other in such joint, producing a root pass weld of welding code quality, which is fully penetrated and completely fused by virtue of a dwell in such oscillation of the electrode wire on either side of such joint, at a selected dwell-period of between 60° and 150° on each half of each oscillation cycle, which produces a concaved weld bead surface that is clean and highly suitable for receiving subsequent weld passes; and subsequently filling such joint with as many similar weld passes as may be necessary to complete the welding operation.

4. Work-in-circuit flux-free electric arc welding horizontally positioned carbon-steel pipe with electric welding current that flows through such pipe and a fusible wire electrode the diameter of which is of the order of 0.030 inch that is continuously fed at a preselected constant speed toward a $CO_2$-argon gas-shielded short-circuiting type arc energized by a welding current amperage of the order of 150 at a substantially constant arc voltage of the order of 17.5 volts, the horizontal pipe sections to be welded being first tack welded top and bottom with fully penetrated arcuate tack welds that extend at least 1–2 inches through the 12 and 6 o'clock positions to provide an open annular V-type joint between such sections with a root-spacing gap actually separating such sections except for such tack welds, feeding the wire electrode radially of the pipe toward such joint, discharging a stream of the arc-shielding gas composed of a mixture of $CO_2$ and argon around and in the same direction as such electrode, conducting the welding current to the electrode wire at it is so fed toward such joint, guiding the operation arcuately along a path concentric with the axis of such pipe, oscillating the wire electrode transversely with respect to such arcuate path as the operation travels therealong, said operation being started by inching the electrode wire into contact with the 12 o'clock tack-weld to start a root pass in such joint which is fully penetrated by the short-circuiting metal transfer and oscillation of the electrode wire from one side to the other in such open V-joint as the unit travels from such 12 o'clock to the 6 o'clock position, stopping such operation at such 6 o'clock position, reversing the direction of travel to return the electrode wire to the 12 o'clock position, and similarly sigma welding a fully penetrated root pass in the open V-joint on the other half of the pipe, starting with the 12 o'clock tack-weld and ending with 6 o'clock tack weld; said oscillation moving the arc rapidly across the joint but acting to dwell at a selected angle of between 60° and 150° of each half-cycle at either side of the joint, whereby good side-wall fusion is assured as well as concave weld-head contour in such root pass to provide a weld base of welding code quality in such joint for subsequent filler weld passes.

5. A steel pipe welding machine for work-in-circuit flux-free electric arc welding horizontally positioned steel pipe with electric welding current that flows through such pipe and a fusible wire electrode the diameter of which is of the order of $\frac{1}{32}$ inch that is continuously fed at a preselected constant speed toward a $CO_2$-argon gas-shielded short-circuiting type arc energized by a welding current amperage of the order of 150 at a substantially constant arc voltage of the order of 17.5 volts, the horizontal pipe sections to be welded being first tack welded top and bottom with fully penetrated arcuate tack welds that extend at least 1–2 inches through the 12 and 6 o'clock positions to provide an open annular V-type joint between such sections with a root-spacing gap of the order of $\frac{1}{16}$–$\frac{1}{8}$ inch actually separating such sections except for such tack welds; said machine comprising a sigma welding unit including means for feeding the wire electrode radially of the pipe toward such joint, means for discharging a stream of the arc-shielding gas composed of a mixture of $CO_2$ and argon around and in the same direction as such electrode, and means for conducting the welding current to the electrode wire as it is so fed toward such joint; means supported by the pipe being welded for guiding said unit arcuately in either direction along a path concentric with the axis of such pipe, a motor connected to drive said unit in such path in a selected direction; means for adjusting the speed of such motor, means for controlling the operation of said motor including the direction of rotation thereof, means for oscillating said welding unit transversely with respect to such path as the unit travels therealong, including a cam and a cam follower one of which is adjustable to change the amplitude of such oscillation, an oscillator-motor connected to drive said cam, and means for adjusting the speed of said oscillator motor to change the frequency of such oscillation; means for inching the electrode wire into contact with the 12 o'clock tack-weld to start a root pass in such joint which is fully penetrated by the short-circuiting metal transfer and oscillation of the electrode wire from one side to the other in such open V-joint as the unit travels from such 12 o'clock to the 6 o'clock position, means for stopping such operation at such 6 o'clock position, means for reversing the direction of travel of such unit to return the electrode wire to the 12 o'clock position, and means for similarly operating the unit to sigma weld a fully penetrated root pass in the open V-joint on the other half of the pipe, starting with the 12 o'clock tack-weld and ending with 6 o'clock tack weld, said cam having a shape such that the wire electrode oscillates rapidly across the joint but dwells at a selected angle of between 60° and 150° of cam revolution at either side thereof, whereby good side-wall fusion is assured as well as concave weld-bead contour in such root pass to provide a weld base of welding code quality in such joint for subsequent filler weld passes.

6. A pipe welding machine for flux-free electric arc welding horizontally positioned pipe, comprising a sigma welding unit including means for feeding a wire electrode radially toward the pipe, means for discharging a stream of arc-shielding gas around and in the same direction as such electrode, and means for conducting the welding current to the electrode wire as it is so fed toward such joint, means supported by the pipe being welded for guiding said unit arcuately in either direction along a path concentric with the axis of such pipe; a motor connected to drive said unit in such path in a selected direction; means for adjusting the speed of such motor, means for controlling the operation of said motor including the direction of rotation thereof, means for oscillating said welding unit transversely with respect to such path as the unit travels therealong, including a cam and a cam follower one of which is adjustable to change the amplitude of such oscillation, an oscillator-motor connected to drive said cam, and means for adjusting the speed of said oscillator motor to change the frequency of such oscillation, said cam having a shape such that said electrode oscillates rapidly across the joint but dwells at a selected angle of between 60° and 150° of cam revolution at either side thereof, whereby good side-wall fusion is assured.

7. A pipe welding machine for work-in-circuit flux-free electric arc welding horizontally positioned pipe with electric welding current that flows through such pipe and a fusible wire electrode that is continuously fed at a preselected constant speed toward gas-shielded short-circuiting type arc energized at a substantially constant arc voltage, said machine comprising a sigma welding unit including means for feeding the wire electrode radially of the pipe toward such joint, means for discharging a stream of the arc-shielding gas around and in the same direction as such electrode, and means for conducting the welding current to the electrode wire as it is so fed toward such joint; means supported by the pipe being welded for guiding said unit arcuately in either direction along a path concentric with the axis of such pipe, a motor connected to drive said unit in such path in a selected direction, means for oscillating said welding unit transversely with respect to such path as the unit travels therealong, including a cam; means for "inching" the electrode wire into contact with a 12 o'clock tack-weld to start a root pass in such joint which is fully penetrated by the short-circuiting metal transfer and oscillation of the electrode wire from one side to the other in such joint as the unit travels from such 12 o'clock to the 6 o'clock position; means for reversing the direction of travel of such unit to return the electrode wire to the 12 o'clock position; and means for similarly operating the unit to sigma weld a fully penetrated root pass in the joint on the other half of the pipe, starting with the 12 o'clock tack-weld; said cam having a shape such that the wire electrode oscillates rapidly across the joint but dwells at a selected angle of between 60° and 150° of cam revolution at either side thereof, whereby good side-wall fusion is assured as well as concave weld-head contour in such root pass to provide a weld base of welding code quality in such joint for subsequent filler weld passes.

8. An automatic welding machine for work-in-circuit electric arc welding comprising an arc welding unit including a torch and a wire electrode reel, a motor connected to drive said unit parallel to a welding path in a selected direction, means for adjusting the speed of such motor, and means for rectilinearly oscillating said entire welding unit transversely in a straight line with respect to such welding path as the unit travels therealong, including a cam and a cam follower one of which is adjustable even while the machine is in operation to precisely change the amplitude of such oscillation, an oscillator motor connected to drive said cam, and means for adjusting the speed of said oscillator motor to change the frequency of such oscillation, said cam having a shape such that the entire longitudinal axis of said torch oscillates across such path but dwells at a selected angle of cam revolution at either side thereof.

9. In welding apparatus for interconnecting a pair of pipe sections disposed in end-to-end relationship, a generally C-shaped support unit adapted to be positioned on one of the pipe sections in spanning relationship thereto and adjacent the joint between said pipe sections; a longitudinally arcuate carrier mounted on said support unit for movement along an angular path of travel defined by said support unit; means on said support unit and operably coupled to said carrier for shifting the latter in opposite directions along said path of travel; a welding head adapted to be connected to a source of current and to receive a welding rod in disposition with one extremity thereof extending outwardly from the head; mounting means secured to said carrier for movement therewith and disposed to overlie said joint between the pipe sections when the support unit is in the normal position thereof on said one pipe section; means mounting said head on the mounting means in disposition with said extremity of the welding rod overlying said joint and for oscillatory movement about an axis causing said extremity of the welding rod to move back and forth across said joint during oscillation of the head; and power means operably coupled to said head for oscillating the latter about said axis at a predetermined rate.

References Cited by the Examiner
UNITED STATES PATENTS

| | | | |
|---|---|---|---|
| 1,580,020 | 4/26 | Cutler et al. | 219—125 |
| 1,933,340 | 10/33 | Raymond | 219—124 |
| 1,956,406 | 4/34 | Vaas | 219—125 |
| 2,013,630 | 9/35 | Goldsborough | 219—60 |
| 2,024,965 | 12/35 | Chapman | 314—39 |
| 2,472,803 | 6/49 | Beyer | 219—125 |
| 2,795,689 | 6/57 | McNutt | 219—125 |
| 2,797,352 | 6/57 | Payne | 314—39 |
| 2,960,597 | 11/60 | Bruno | 219—125 |
| 3,035,156 | 5/62 | Staley | 219—125 |

RICHARD M. WOOD, *Primary Examiner.*
ANTHONY BARTIS, *Examiner.*